(12) United States Patent
Chen et al.

(10) Patent No.: US 12,413,739 B2
(45) Date of Patent: Sep. 9, 2025

(54) METHOD AND DEVICE FOR DIVIDING GROUP OF PICTURES BASED ON SCENE SWITCHING, AND STORAGE MEDIUM

(71) Applicant: BIGO TECHNOLOGY PTE. LTD., Singapore (SG)

(72) Inventors: Dapeng Chen, Guangzhou (CN); Yiyan Feng, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 32 days.

(21) Appl. No.: 18/042,733

(22) PCT Filed: Jul. 23, 2021

(86) PCT No.: PCT/CN2021/108116
§ 371 (c)(1),
(2) Date: Feb. 23, 2023

(87) PCT Pub. No.: WO2022/042156
PCT Pub. Date: Mar. 3, 2022

(65) Prior Publication Data
US 2023/0370608 A1 Nov. 16, 2023

(30) Foreign Application Priority Data
Aug. 27, 2020 (CN) .......................... 202010879575.0

(51) Int. Cl.
*H04N 19/142* (2014.01)
*H04N 19/159* (2014.01)
*H04N 19/177* (2014.01)

(52) U.S. Cl.
CPC ......... *H04N 19/142* (2014.11); *H04N 19/159* (2014.11); *H04N 19/177* (2014.11)

(58) Field of Classification Search
CPC .......................... H04N 19/142; H04N 19/177
See application file for complete search history.

(56) References Cited

U.S. PATENT DOCUMENTS 6,480,540 B1 11/2002 Guillotel
6,959,044 B1 10/2005 Jin et al.
(Continued)

FOREIGN PATENT DOCUMENTS

| CN | 101489138 A | 7/2009 |
| CN | 102630013 A | 8/2012 |

(Continued)

OTHER PUBLICATIONS

European Patent Office, Extended European Search Report pursuant to Rule 62 EPC, dated Jan. 22, 2024 in Patent Application No. 21859996.7, which is a foreign counterpart to this U.S. Application.

(Continued)

*Primary Examiner* — Jayanti K Patel
*Assistant Examiner* — Christopher Kingsbury Glover
(74) *Attorney, Agent, or Firm* — Kolitch Romano Dascenzo Gates LLC

(57) ABSTRACT

A method for dividing a group of pictures (GOP) based on scene switching in encoding a video. The method includes determining whether a scene switching frame is present in a current GOP of received video data. It is then determined whether a last video frame of the current GOP is the scene switching frame. A first scene switching frame of the current GOP is also determined as a target scene switching frame and this target scene switching frame is acquired by traversing the scene switching frames from back to front. The video frame previous to the target scene switching frame is set as the last video frame of the current GOP. A next GOP is determined to include the number of video frames that follow the target scene switching frame and include the target scene switching frame.

20 Claims, 7 Drawing Sheets

(56) References Cited

U.S. PATENT DOCUMENTS

| | | | |
|---|---|---|---|
| 2007/0247549 A1 | 10/2007 | Jeong et al. | |
| 2011/0069757 A1* | 3/2011 | Ammu | H04N 19/177 375/E7.243 |
| 2014/0254660 A1 | 9/2014 | La | |
| 2019/0182480 A1 | 6/2019 | Mao et al. | |
| 2019/0260999 A1 | 8/2019 | Xiong et al. | |
| 2021/0120061 A1* | 4/2021 | Labrozzi | H04L 65/612 |

FOREIGN PATENT DOCUMENTS

| | | | |
|---|---|---|---|
| CN | 103491381 A | 1/2014 | |
| CN | 106412580 A | 2/2017 | |
| CN | 107770538 A | 3/2018 | |
| CN | 112019850 A | 12/2020 | |
| JP | 2002152683 A | 5/2002 | |
| JP | 2008182408 A | 8/2008 | |
| JP | 4650454 B2 * | 3/2011 | |
| KR | 20060052346 A | 5/2006 | |
| WO | 2017105391 A1 | 6/2017 | |

OTHER PUBLICATIONS

International Search Report of the International Searching Authority for State Intellectual Property Office of the People's Republic of China in PCT application No. PCT/CN2021/108116 issued on Nov. 3, 2021, which is an international application to which this application claims priority.

The State Intellectual Property Office of People's Republic of China, First Office Action in Patent Application No. CN202010879575.0 issued on Mar. 25, 2022, which is a foreign counterpart application corresponding to this U.S. Patent Application, which is foreign counterpart application of this US application.

* cited by examiner

METHOD AND DEVICE FOR DIVIDING GROUP OF PICTURES BASED ON SCENE SWITCHING, AND STORAGE MEDIUM

CROSS-REFERENCE TO RELATED APPLICATIONS

This application is a U.S. national stage of international application No. PCT/CN2021/108116, field on Jul. 23, 2021, which claims priority to Chinese Patent Application No. 202010879575.0, filed on Aug. 27, 2020, the contents of which are herein incorporated by reference in their entireties.

TECHNICAL FIELD

The present disclosure relates to the field of video coding technologies, and in particular, relates to a method for dividing a group of pictures based on scene switching, an electronic device, and a non-volatile storage medium.

BACKGROUND OF THE INVENTION

In video data encoding, video data is usually encoded according to a group of pictures with a specified length. The group of pictures includes a plurality of video frames. That is, a video frame sequence using a key frame as a start frame and a frame prior to a next key frame as an end frame is determined as a group of pictures, and a first frame of the group of pictures is a key frame.

SUMMARY OF THE INVENTION

Some embodiments of the present disclosure provide a method for dividing a group of pictures based on scene switching, an electronic device, and a non-volatile storage medium.

Some embodiments of the present disclosure provide a method for dividing a group of pictures based on scene switching. The method includes:
  determining whether a scene switching frame is present in a current group of pictures of received video data, wherein the current group of pictures includes a specified number of video frames;
  in response to at least one scene switching frame being present in the current group of pictures, determining whether a last video frame of the current group of pictures is the scene switching frame;
  in response to the last video frame of the current group of pictures being the scene switching frame, determining a first scene switching frame of the current group of pictures as a target scene switching frame of the current group of pictures; or
  in response to the last video frame of the current group of pictures being not the scene switching frame, acquiring the target scene switching frame by traversing the at least one scene switching frame in the current group of pictures from back to front;
  determining a previous video frame of the target scene switching frame as the last video frame of the current group of pictures; and
  determining the specified number of video frames that follow the target scene switching frame and include the target scene switching frame as a next group of pictures, determining the next group of pictures as the current group of pictures, and returning to the step of determining whether a scene switching frame is present in a current group of pictures of received video data.

Some embodiments of the present disclosure provide a method for encoding a video. The method includes:
  receiving video data;
  dividing the video data into a plurality of groups of pictures; and
  encoding a first video frame in each of the group of pictures as a key frame;
  wherein the plurality of groups of pictures are divided according to the method for dividing the group of pictures based on scene switching as described above.

Some embodiments of the present disclosure provide an electronic device. The electronic device includes:
  one or more processors; and
  a memory, configured to store one or more programs;
  wherein the one or more programs, when loaded and run by the one or more processors, cause the one or more processors to perform the method for dividing the group of pictures based on scene switching as described above, and/or, the method for encoding the video as described above.

Some embodiments of the present disclosure provide a non-volatile computer-readable storage medium, storing one or more computer programs, wherein the one or more computer programs, when loaded and run by a processor, cause the processor to perform the method for dividing the group of pictures based on scene switching as described above, and/or, the method for encoding the video as described above.

DETAILED DESCRIPTION OF THE INVENTION

During the process of encoding the video data based on the group of pictures with a specified length, in a case that scene switching occurs abruptly in the video content, a video encoder encodes a video frame subjected to the scene switching as a key frame, and the group of pictures is re-divided by inserting the key frame. This approach can eliminate an error propagation caused by an inter-frame reference during the encoding process, and thus a high-quality reference can be provided for subsequent video frames.

In the related art, in a case that a scene switching frame is detected in a group of pictures, the scene switching frame is encoded as the key frame. Because only inter-frame information is referenced when encoding the scene switching frame as the key frame, a compression rate of the encoding is low. In a case that a plurality of scene switching frames detected in a group of pictures are all encoded as the key frames, a compression rate of the entire video is reduced.

The present disclosure is described hereinafter with reference to the accompanying drawings and exemplary embodiments.

First Embodiment

Figure 1:
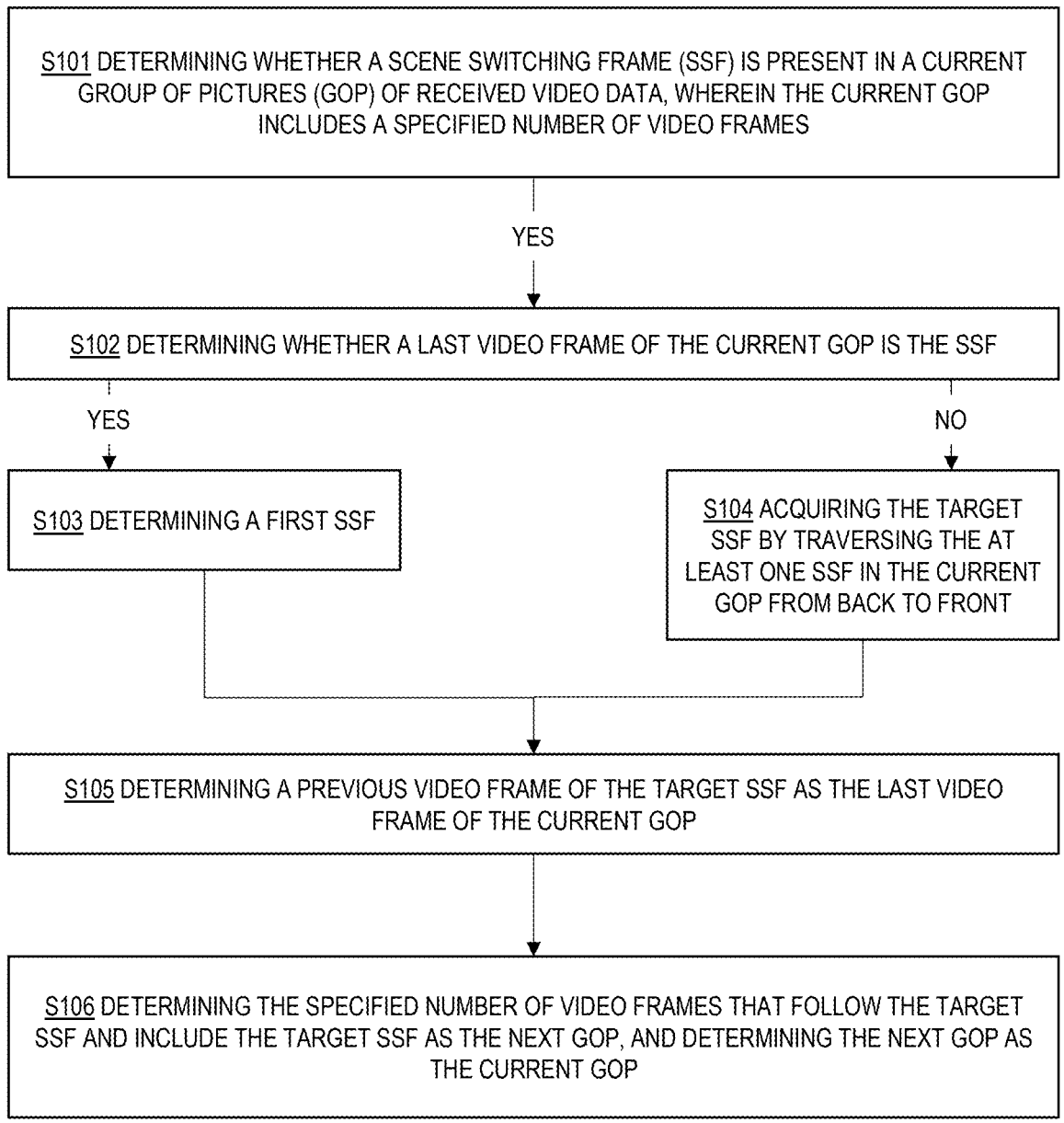
FIG. 1 is a flowchart of steps of a method for dividing a group of pictures based on scene switching according to a first embodiment of the present disclosure.

FIG. 1 is a flowchart of steps of a method for dividing a group of pictures based on scene switching in encoding a video according to a first embodiment of the present disclosure. This embodiment is applicable to a scenario where video data is divided into a group of pictures in encoding. The method is performed by an apparatus for dividing a group of pictures based on scene switching according to some embodiments of the present disclosure, which is implemented by hardware or software and integrated in an electronic device according to some embodiments of the present disclosure. As illustrated in FIG. 1, the method for dividing the group of pictures based on scene switching according to this embodiment includes the following steps.

Figure 8:
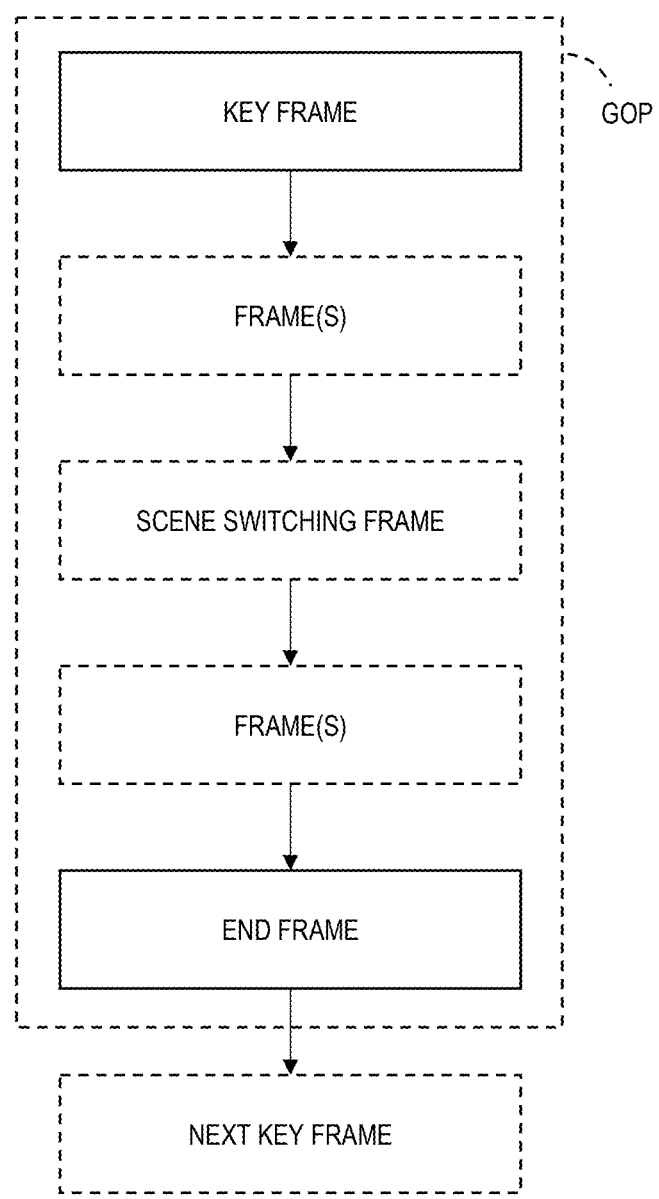
FIG. 8 is a schematic diagram depicting illustrative video frames in the context of a group of pictures (GOP) in accordance with aspects of the present disclosure.

In S101, whether a scene switching frame is present in a current group of pictures of received video data is determined, wherein the current group of pictures includes a specified number of video frames. See FIG. 8.

The group of pictures (GOP) refers to a group of successive pictures in the video data. That is, the GOP is a picture set, a first video frame of the GOP shall be a key frame (an I frame), and a GOP includes a key frame (an I frame) and a plurality of prediction frames (P frames or B frames).

During encoding the video data, a length of the GOP is predefined. That is, a GOP includes a specified number of video frames, and the current GOP is received in a case that the specified number of video frames are received during encoding. For example, the specified number is 15, and in a case that an encoder receives 15 video frames, the currently received 15 video frames are determined as the current GOP. In this case, a scene switching detection is performed on the current GOP. Scene switching occurring in two video frames refers to that a change amount between scene measurements of video contents of the two video frames is greater than a predefined threshold.

In some embodiments, the scene measurement of the video content is carried out according to one of parameters such as brightness, histogram, inter-frame prediction cost, video frame similarity, and the like of the video frames. In detecting whether the scene switching occurs between two video frames, whether the scene switching occurs between a current video frame and a previous video frame is detected by calculating a brightness difference, a histogram difference, an inter-frame prediction cost, a video frame similarity, and the like between the current video frame and the previous video frame. In a case that the scene switching occurs between the current video frame and the previous video frame, the current video frame is determined as the scene switching frame. In some embodiments, whether the current video frame and the previous video frame of the current video frame are the scene switching frames is detected by a trained neural network. The way to determine whether the current GOP includes the scene switching frame is not limited herein.

In some embodiments of the present disclosure, in a case that the scene switching frame is determined to be present in the current GOP, S102 is performed; and in a case that the scene switching frame is not present in the current GOP, the current GOP does not require to be re-divided, and a next GOP is received as the current GOP and proceed until an end of the video data.

In S102, in a case that at least one scene switching frame is present in the current GOP, whether a last video frame of the current GOP is the scene switching frame is determined.

In a case that the current GOP is determined to include at least one scene switching frame upon performing the scene switching detection, whether the last video frame of the current GOP is the scene switching frame is determined. In a case that the last video frame of the current GOP is the scene switching frame, S103 is performed; and in a case that the last video frame of the current GOP is not the scene switching frame, S104 is performed.

Exemplarily, when performing the scene switching detection on a GOP, in a case that a video frame is detected to be the scene switching frame, a scene switching marker is marked onto the video frame, and whether the last video frame of the current GOP has the scene switching marker is detected. For example, a GOP includes 20 video frames, and whether the twentieth video frame of the GOP has the scene switching marker is determined. In a case that the twentieth video frame of the GOP has the scene switching marker, the last video frame of the GOP is the scene switching frame.

In S103, a first scene switching frame of the current GOP is determined as a target scene switching frame of the current GOP.

In some embodiments, the current GOP includes one or more scene switching frames. In a case that the last video frame of the current GOP is the scene switching frame, the first video frame, from front to back, of the current GOP is determined as the target scene switching frame of the current GOP, and other scene switching frames are not determined as the scene switching frames, that is, the scene switching markers of other video frames in the current GOP are cancelled.

In S104, the target scene switching frame is acquired by traversing the at least one scene switching frame in the current GOP from back to front.

In the case that the last video frame of the current GOP is not the scene switching frame, the scene switching frames in the current GOP are reversely traversed from back to front. In a case that one of the scene switching frames is traversed, whether a previous video frame and a next video frame of a currently traversed video frame constitute the scene switching is determined. In a case that the previous video frame and the next video frame of the currently traversed video frame constitute the scene switching, the currently traversed video frame is determined as the target scene switching frame, and other scene switching frames are not determined as the scene switching frames, that is, the scene switching markers of other video frames in the current GOP are cancelled. In a case that a previous video frame and a next video frame of the currently traversed video frame do not constitute the scene switching, the scene switching frames in the GOP are continued to be traversed to a second video frame of the current GOP. In a case that the target scene switching frame is still not determined even though the second video frame of the current GOP is traversed, it is determined that the current GOP does not have the scene switching frame, the next GOP continues to be received as the current GOP, and the process returns to S101.

In some embodiments, the video frames in the current GOP are traversed from back to front. In a case that the video frame is the scene switching frame (e.g., the video frame has the scene switching mark), whether a previous video frame and a next video frame of a currently traversed video frame constitute the scene switching is determined. In a case that the previous video frame and the next video frame of the currently traversed video frame constitute the scene switching, the video frame is determined as the target scene switching frame. In a case that the previous video frame and the next video frame of the currently traversed video frame do not constitute the scene switching, the video frames are continuously traversed forward to the second video frame of the current GOP.

In S105, a previous video frame of the target scene switching frame is determined as the last video frame of the current GOP.

In a case that the target scene switching frame is determined in the current GOP, a large difference is present between a scene of the target scene switching frame and scenes of a plurality of previous video frames, and thus it is of little significance to continue to encode the target scene switching frame by referring to the previous video frames. The target scene switching frame is encoded as the key frame, such that the current GOP is re-divided by inserting the key frame into the current GOP. In this way, a video frame prior to the target scene switching frame is determined as the last video frame of the current GOP, and the target scene switching frame is determined as a first video frame of a new GOP.

In S106, the specified number of video frames that follow the target scene switching frame and include the target scene switching frame are determined as the next GOP, and the next GOP is determined as the current GOP.

Upon determining the video frame prior to the target scene switching frame as the last video frame of the current GOP, the next GOP is determined. The next GOP includes the specified number of video frames. That is, the next GOP includes the target scene switching frame and a plurality of video frames following the target scene switching frames.

Exemplarily, the received current GOP is a first to twentieth video frames of the video data and the specified number of video frames of the GOP is twenty. In a case that a tenth video frame is determined as the target scene switching frame, the first to ninth video frames are determined as the current GOP, and the tenth to thirtieth video frames are determined as the next GOP. Upon determining the next GOP as the current GOP, the process returns to S101, to the end of the video data.

According to some embodiments of the present disclosure, under the prerequisite that the scene switching frame is present in the current GOP, in the case the last video frame of the current GOP is the scene switching frame, the first scene switching frame of the current GOP is determined as the target scene switching frame, and in the case that the last video frame of the current GOP is not the scene switching frame, the target scene switching frame is acquired by traversing the scene switching frames in the GOP from back to front; the video frame prior to the target scene switching frame is determined as the last video frame of the current GOP; and the specified number of video frames that follow the target scene switching frame and include the target scene switching frame are determined as the next GOP. In this way, the current GOP is re-divided based on the scene switching, such that a problem of a low compression rate of the video data caused by encoding all the scene switching frames in the current GOP as the key frames is addressed. The current GOP is re-divided by selecting a target scene switching frame from the plurality of scene switching frames in the current GOP. Compared to prior art technology in which every scene switching frame is determined as a key frame, the embodiments of the present disclosure determine a target scene switching frame among a plurality of scene switching frames, such that the number of video frames, in the current GOP, encoded as the key frames is reduced, and thus the number of GOPs divided according to the target scene switching frame is decreased, which improve the compression rate of the video data.

Second Embodiment

Figure 2:
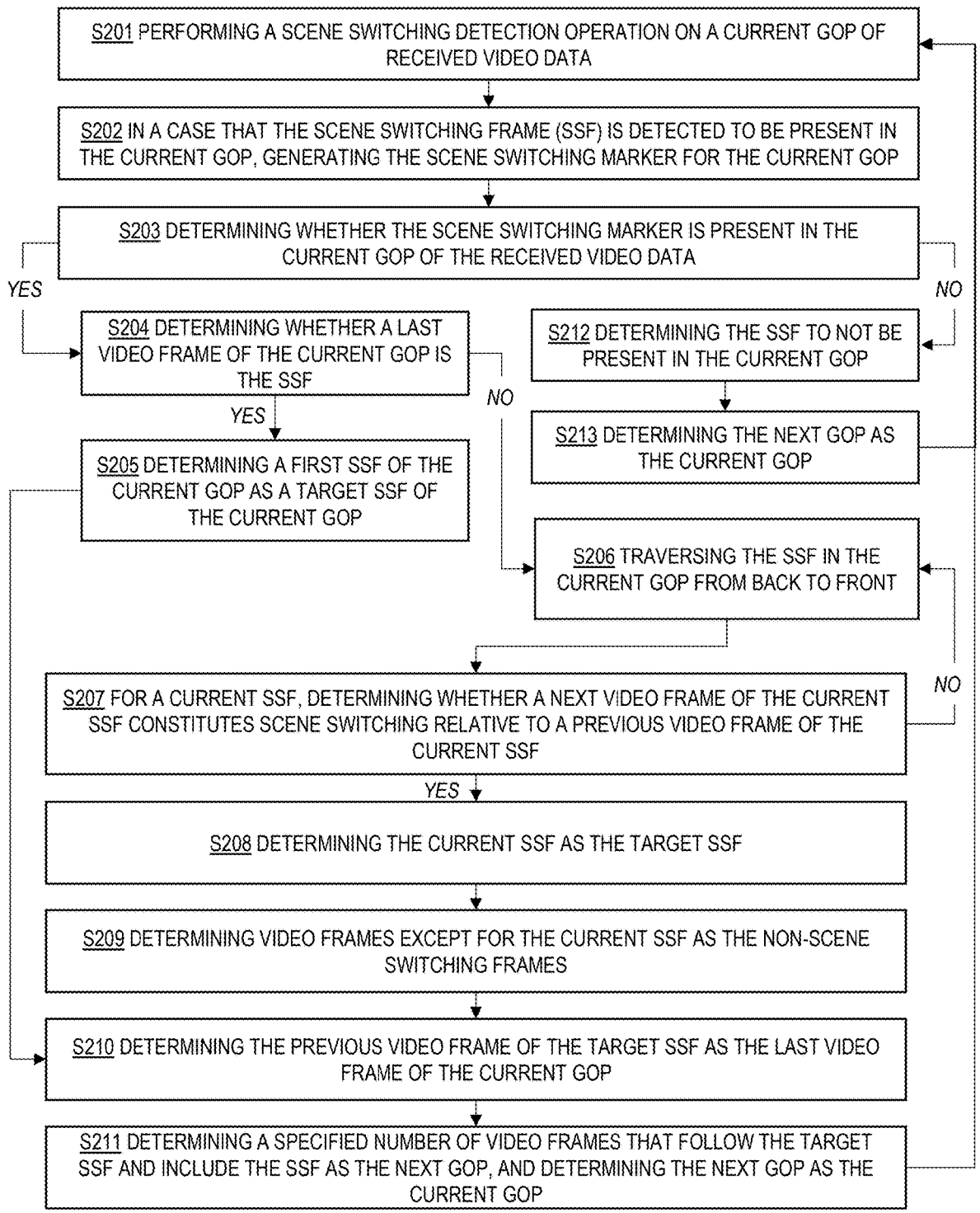
FIG. 2 is a flowchart of steps of a method for dividing a group of pictures based on scene switching according to a second embodiment of the present disclosure.

FIG. 2 is a flowchart of steps of a method for dividing a group of pictures based on scene switching according to a second embodiment of the present disclosure. This embodiment is described on the basis of the above first embodiment. As illustrated in FIG. 2, the method for dividing the group of pictures based on scene switching according to this embodiment includes the following steps.

In S201, a scene switching detection operation is performed on a current GOP of received video data.

In some embodiments of the present disclosure, a length of the GOP is predefined. That is, received specified number of video frames are determined as a GOP. Each time the specified number of video frames are received, that is, the current GOP is received, the scene switching detection operation is performed on the current GOP.

In some optional embodiments, during performing the scene switching detection operation on the current GOP, video frames following a first video frame of the current GOP are traversed first. During traversing the video frames, whether a current video frame is a scene switching frame relative to the first video frame of the current group is determined. If the current video frame is the scene switching frame relative to the first video frame of the current GOP, in a case the current video frame is the scene switching frame relative to a previous video frame of the current video frame, the current video frame is marked as the scene switching frame. If the current video frame is not the scene switching frame relative to the first video frame of the current GOP, video frames between the current video frame and the first video frame are determined as non-scene switching frames. That is, scene switching markers of the video frames between the current video frame and the first video frame are cancelled.

Whether a video frame is the scene switching frame relative to another video frame may be determined by embodiments discussed below. Exemplarily, in determining whether a second video frame following the first video frame is the scene switching frame, one of parameters such as a brightness difference, a histogram difference, an inter-frame prediction cost, a video frame similarity, and the like between the second video frame and the first video frame is calculated, and whether the second video frame is the scene switching frame is determined by comparing the one of the parameters such as the brightness difference, the histogram difference, the inter-frame prediction cost, and the video frame similarity with a predefined threshold. In some examples, in a case that the brightness difference is greater than the predefined threshold, the second video frame is determined as the scene switching frame. Alternatively, in a case that the video similarity is less than the predefined threshold, the second video frame is determined as the scene switching frame. In some embodiments, whether the second video frame is the scene switching frame is determined by a trained neural network. The way to determine whether a video frame is the scene switching frame is not limited herein.

In some examples, the current GOP includes first to twentieth video frames. When traversing a tenth video frame, whether the tenth video frame is the scene switching frame relative to the first video frame is determined. Under the prerequisite that the tenth video frame is the scene switching frame relative to the first video frame, in a case that the tenth video frame is the scene switching frame relative to a ninth video frame, the scene switching marker is marked on the tenth video frame; and in a case that the tenth video frame is not the scene switching frame relative to the ninth video frame, the scene switching marker does not require to be made on the tenth video frame. In a case that the tenth video frame is the non-scene switching frame relative to the first video frame, the scene switching marker does not require to be made on the tenth video frame, and scene switching markers of the second video frame to the ninth video frame are cancelled.

In a GOP, in a case that the current video frame is the scene switching frame relative to both the previous video frame and the first video frame, the current video frame is determined as the scene switching frame. In a case that the current video frame is not the scene switching frame relative to the first video frame, a scene of the current video frame is not much different from a scene of the first video frame, and scenes of video frames between the current video frame and the first video frame are also not much different from the scene of the first video frame, and the video frames are encoded referring to the first video frame. The video frames between the current video and the first video frame are determined as the non-scene switching frames, such that the current video frame is prevented from being misjudged as the scene switching frame due to shaking and unstable pictures, and thus an accuracy of the scene switching detection is ensured.

In other optional embodiments of the present disclosure, the current video frame (an $n^{th}$ video frame) is marked as the scene switching frame after the above scene switching detection. A first intra-frame prediction cost of the current video frame and an $(n-1)^{th}$ video frame, a second intra-frame prediction cost of the $(n-1)^{th}$ video frame and an $(n-2)^{th}$ video frame, and a difference between the first intra-frame prediction cost and the second intra-frame prediction cost are calculated. In a case that a ratio of the difference to the second intra-frame prediction cost is greater than the predefined threshold, the current video frame is kept being marked as the scene switching frame, and in a case that the ratio of the difference to the second intra-frame prediction cost is less than the predefined threshold, the current video frame is determined as the non-scene switching frame.

In some embodiments, a first intra-frame prediction cost of the current video frame and the previous video frame is calculated first, a second intra-frame prediction cost between adjacent two video frames in the current GOP are calculated, then an average of the plurality of second intra-frame prediction costs is calculated, and afterwards, a ratio of the first intra-frame prediction cost to the average is calculated. In a case that the ratio is greater than the predefined threshold, the current video frame is kept being marked as the scene switching frame; and in a case that the ratio is not greater than the predefined threshold, the current video frame is determined as the non-scene switching frame, and a scene switching marker of the current video frame is cancelled.

In the intra-frame prediction, a prediction value is generated using encoded pixels in adjacent pictures, and a residual acquired by subtracting an original value from the prediction value is determined as the intra-frame prediction cost. Exemplarily, for the current video frame, a best matching block is found on a reference video frame, and the best matching block is the prediction value. In some embodiments, the best matching block is acquired from a motion estimation with ½ or ¼ pixel precision by motion compensation (i.e., interpolation), and a residual acquired by a subtract operation between a pixel value of the best matching block and a pixel value of the current video frame is the intra-frame prediction cost. For the intra-frame prediction, reference is made to any intra-frame prediction in the related art, which is not limited herein.

The embodiments of the present disclosure determine whether the current video is the scene switching frame by the intra-frame prediction cost. In this way, a misjudgment caused by a large motion amplitude, or a fast change of a whole video is avoided, such that the accuracy of the scene switching frame detection is improved, and thus an accuracy of dividing the GOP is improved.

In S202, in a case that the scene switching frame is detected to be present in the current GOP, the scene switching marker is generated for the current GOP.

In the case that the scene switching frame is detected in the current GOP, the scene switching marker is marked on the current GOP. Exemplarily, the scene switching marker of the current GOP is any character such as a number, a letter, a symbol, or the like.

In S203, whether the scene switching marker is present in the current GOP of the received video data is determined.

In some examples, the scene switching detection is performed on the current GOP first. Under the prerequisite that an encoder receives a GOP, in a case that the GOP is marked with the scene switching marker, the GOP includes at least one scene switching frame, and S204 to S211 are performed; and in a case that the GOP is not marked with the scene switching marker, S212 to S213 are performed.

In S204, whether a last video frame of the current GOP is the scene switching frame is determined.

In a case that the scene switching frame is present in the current GOP, whether the last video frame of the current GOP has the scene switching marker is determined. In a case that the scene switching marker is present in the last video frame of the current GOP, the last video frame of the current GOP is the scene switching frame, and S205 is performed. In a case that the scene switching marker is not present in the last video frame of the current GOP, the last video frame of the current GOP is not the scene switching frame, and S206 to S209 are performed.

In S205, a first scene switching frame of the current GOP is determined as a target scene switching frame of the current GOP.

The current GOP includes one or more scene switching frames. In the case that the last video frame of the current GOP is the scene switching frame, the first scene switching frame, from front to back, in the current GOP is determined as the target scene switching frame of the current GOP. Other scene switching frames are not determined as the scene switching frames. That is, scene switching markers of other video frames in the current GOP are cancelled.

In other optional embodiments, the number of video frames between the first scene switching frame and a last video frame of the video data is calculated. In a case the number of video frames is less than a predefined number, the first scene switching frame is determined as the non-scene switching frame. In a case that the current GOP is a last GOP of the video data, the first scene switching frame of the current GOP is close to the end of the video data. It is not cost-effective to add the scene switching frame near the end of the video data, and thus the first scene switching frame is not determined as the target scene switching frame, and the last GOP is not re-divided as well. In this way, a problem of a waste of video bit rates caused by adding the scene switching frame at the end of the video data and encoding the added scene switching frame as the key frame is addressed, such that the bit rate of the video data is improved.

In S206, the scene switching frames in the current GOP are traversed from back to front.

In some examples, video frames marked with the scene switching markers in the current GOP are reversely traversed from back to front. Each time one of the video frames marked with the scene switching marker is traversed, S207 to S209 are performed.

Video frames in the current GOP are reversely traversed from back to front. In a case that a traversed current video frame has the scene switching marker, S207 to S209 are performed. In a case that the traversed current video frame does not have the scene switching marker, the video frames are continuously traversed forward to a second video frame of the current GOP.

In S207, for a current scene switching frame, whether a next video frame of the current scene switching frame constitutes scene switching relative to a previous video frame of the current scene switching frame is determined.

Each time one of the scene switching frames is traversed, a previous video frame and a next video frame of the scene switching frame are acquired. In a case that the next video frame of the scene switching frame constitutes the scene switching relative to the previous video frame of the scene switching frame, S208 is performed. Whether two video frames constitute the scene switching is determined according to one of a brightness difference, a histogram difference, an inter-frame prediction cost, a video frame similarity, and the like between the two video frames, which is not repeated herein.

In a case that the target scene switching frame is not determined even the second video frame of the current GOP is traversed, the scene switching frame is not present in the current GOP, and the current GOP does not require to be re-divided.

In some optional embodiments, in the case that the next video frame of the current scene switching frame constitutes the scene switching relative to the previous video frame of the current scene switching frame, the number of video frames between the current scene switching frame and the last video frame of the video data is calculated. In a case that the number of video frames is less than the predefined number, the current scene switching frame is determined as the non-scene switching frame. In the case that the current GOP is the last GOP of the video data, the current scene switching frame is close to the end of the video data. It is not cost-effective to add the scene switching frame close to the end of the video data, and thus the current scene switching frame is not determined as the target scene switching frame, that is, the last GOP is not re-divided. In this way, the problem of the waste of the video bit rates caused by adding the scene switching frame at the end of the video data and encoding the added scene switching frame as the key frame is addressed, such that the bit rate of the video data is improved.

In S208, the current scene switching frame is determined as the target scene switching frame.

In the case that the next video frame of the current scene switching frame constitutes the scene switching relative to the previous video frame of the current scene switching frame, the current scene switching frame is determined as the target scene switching frame of the current GOP, and an operation of traversing the scene switching frames in the current GOP from back to front is ended. In the case that the next video frame of the current scene switching frame does not constitute the scene switching relative to the previous video frame of the current scene switching frame, it is continued to traverse the scene switching frames in the current GOP from back to front to the second video frame of the current GOP.

In S209, video frames except for the current scene switching frame are determined as the non-scene switching frames.

In a case that the target scene switching frame has been determined in the current GOP, scene switching markers of scene switching frame, in the current GOP, except for the current scene switching frame are cancelled. That is, only one scene switching frame is selected from the current GOP to be determined as the target scene switching frame.

In S210, the previous video frame of the target scene switching frame is determined as the last video frame of the current GOP.

In the case that the target scene switching frame is determined in the current GOP, a large difference is present between a scene of the target scene switching frame and scenes of a plurality of previous video frames. The target scene switching frame is encoded as the key frame, such that the current GOP is re-divided by inserting the key frame into the current GOP. In this way, a video frame prior to the target scene switching frame is determined as the last video frame of the current GOP, and the target scene switching frame is determined as a first video frame of a new GOP.

In S211, a specified number of video frames that follow the target scene switching frame and include the target scene switching frame are determined as the next GOP, and the next GOP is determined as the current GOP.

In the case that the video frame prior to the target scene switching frame is determined as the last video frame of the current GOP, the next GOP is determined. The next GOP includes the specified number of video frames. That is, the next GOP includes the target scene switching frame and a plurality of video frames following the target scene switching frame. The next GOP is determined as the current GOP, and the process returns to S201.

In S212, the scene switching frame is determined to not be present in the current GOP.

In a case that the scene switching marker is not present in the current GOP, the scene switching frame is not present in the current GOP, and thus the current GOP does not require to be re-divided by inserting the key frame.

In S213, the next GOP is determined as the current GOP.

In the case that the scene switching frame is not present in the current GOP, the next GOP is continued to be received as the current GOP and the process returns to S201, until all the video frames of the video data are divided into the GOPs.

In other optional embodiments of the present disclosure, for the current GOP, in the case that the scene switching frame is determined to be present in the current GOP, prior to determining whether the last video frame of the current GOP is the scene switching frame, whether a previous GOP is re-divided is determined. In a case that the previous GOP is re-divided, the current GOP is not re-divided, the next GOP of the current GOP is received as the current GOP, and the process returns to the step of determining whether the scene switching frame is present in the current GOP of the received video data. In a case that the previous GOP is not re-divided, in a case that the scene switching frame is present in the previous GOP and the current GOP is not re-divided, the next GOP of the current GOP is received as the current, and the process returns to the step of determining whether the scene switching frame is present in the current GOP of the received video data; and in a case that the scene switching frame is not present in the previous GOP, the process returns to the step of determining whether the last video frame of the current GOP is the scene switching frame. The previous GOP is a GOP received prior to receiving the current GOP.

For the current GOP, under the prerequisite that that the scene switching frame is determined to be present in the current GOP, in a case that the key frame is inserted into the previous GOP (the target scene switching frame for re-dividing the previous GOP is determined in the previous GOP), the key frame is not inserted into the current GOP, that is, the current GOP is encoded normally without any processing and the next GOP is directly received as the current GOP; in a case that the key frame is not inserted into the previous GOP (the target scene switching frame for re-dividing the previous GOP is not determined in the previous GOP), whether the scene switching frame is present in the previous GOP is determined; in a case that the scene switching frame is not present in the previous GOP, images of the previous GOP are stable, and the step of determining whether the last video frame of the current GOP is the scene switching frame is performed; and in a case that the scene switching frame is present in the current GOP, the images of the previous GOP are unstable, the step of determining whether the last video frame of the current GOP is the scene switching frame is not performed, and the next GOP is directly received as the current GOP.

Exemplarily, for the current GOP n, under the prerequisite that the scene switching frame is detected in the current GOP (i.e., the $n^{th}$ GOP), if a received previous GOP (i.e., the $(n-1)^{th}$ GOP) is re-divided (the target scene switching frame is determined), the key frame is not inserted into the current GOP (i.e., the $n^{th}$ GOP), that is, the operation of determining whether the last video frame of the current GOP is the scene switching frame is not performed, and the next GOP (i.e., the $(n+1)^{th}$ GOP) is directly received as the current GOP. If the previous GOP (i.e., the $(n-1)^{th}$ GOP), is not re-divided (the target scene switching frame is not determined), and the scene switching frame is not detected in the previous GOP (i.e., the $(n-1)^{th}$ GOP) it indicates that the images of the previous GOP (i.e., the $(n-1)^{th}$ GOP) is stable, and the step of determining whether the last video frame of the current GOP is the scene switching frame is required to be performed for the current GOP, (i.e., the $n^{th}$ GOP), that is, steps of S204-S213 are required to be performed.

According to some embodiments of the present disclosure, the insertion of the key frame based on the stability of GOP is advantageous. For example, after a first GOP is re-divided by inserting a key frame into the first GOP, the insertion of a key frame into a later GOP (e.g., ith GOP) is proceeded only until the images of a second GOP or a GOP previous to the ith GOP are stable. In this way, the number of inserted key frames is reduced, and a misjudgment of the scene switching frames due to instabilities of the images is avoided, such that both a compression rate of the video data and an accuracy of dividing the GOP are improved.

Figure 3A:
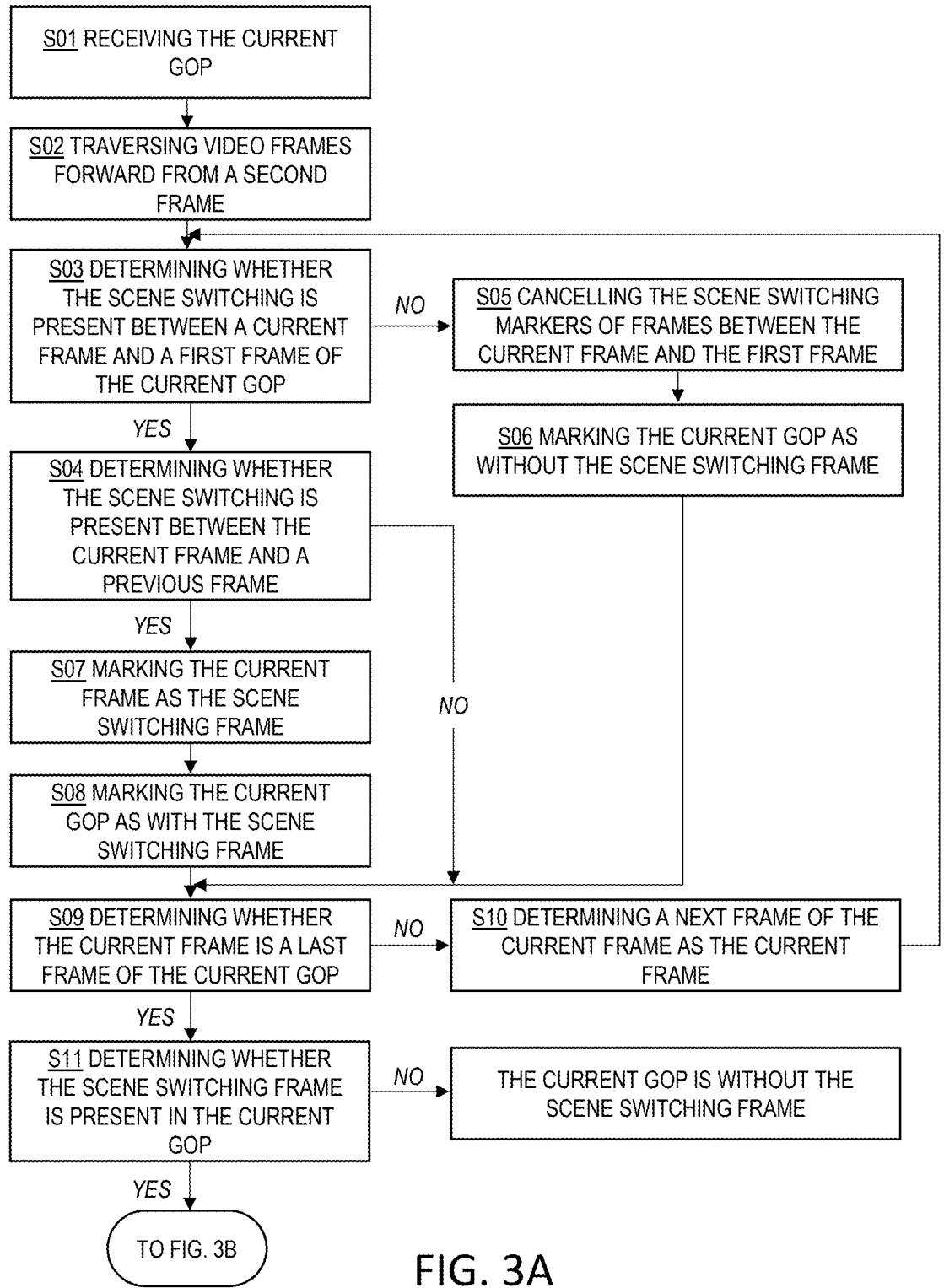
FIGS. 3A and 3B are a flowchart of a method for dividing a group of pictures based on scene switching according to a second embodiment of the present disclosure.
Figure 3B:
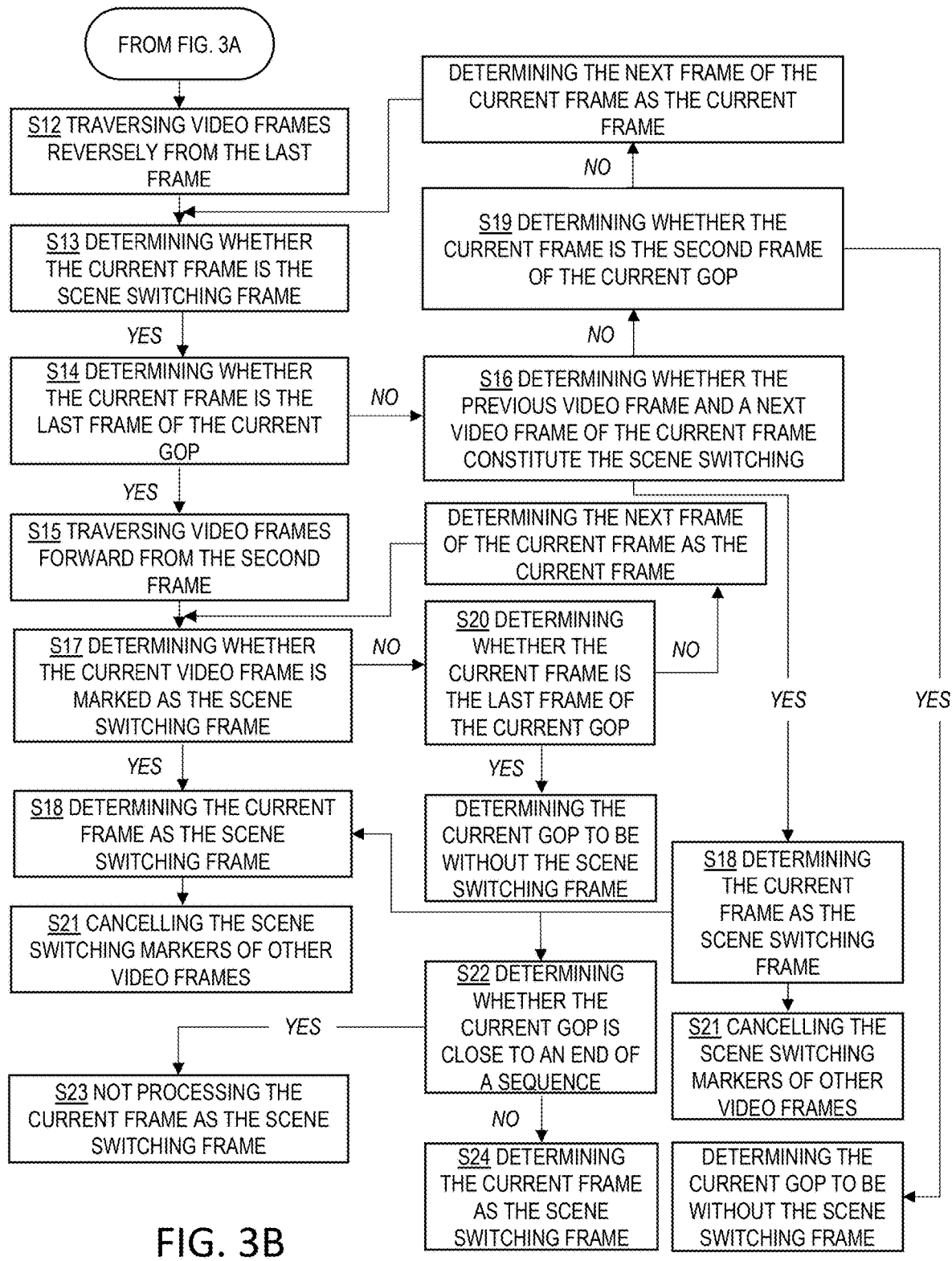

The method for dividing the group of pictures based on scene switching according to the embodiments of the present disclosure are illustratively described hereinafter in conjunction with FIGS. 3A and 3B. As illustrated in FIGS. 3A and 3B, in some examples, the method for dividing the group of pictures based on scene switching includes the following steps.

In S01, the current GOP is received.

In S02, video frames are forward traversed from a second frame, that is, the video frames are traversed, from front to back, from the second frame of the current GOP.

In S03, whether the scene switching is present between a current frame and a first frame of the current GOP is determined. In a case that the scene switching is present between the current frame and the first frame of the current GOP, S04 is performed; and in a case that the scene switching is not present between the current frame and the first frame of the current GOP, S05, S06, and S09 are performed.

In S04, whether the scene switching is present between the current frame and a previous frame is determined. In a case that the scene switching is present between the current frame and the previous frame, S07 is performed; and in a case that the scene switching is not present between the current frame and the previous frame, S09 is performed.

In S05, the scene switching markers of frames between the current frame and the first frame are cancelled.

In S06, the current GOP is marked as without the scene switching frame.

In S07, the current frame is marked as the scene switching frame.

In S08, the current GOP is marked as with the scene switching frame.

In S09, whether the current frame is a last frame of the current GOP is determined. In a case that the current frame is the last frame of the current GOP, S11 is performed; and in a case that current frame is not the last frame of the current GOP, S10 is performed.

In S10, a next frame of the current frame is determined as the current frame, and the process returns to S03.

In S11, whether the scene switching frame is present in the current GOP is determined. In the case that the scene switching frame is present in the current GOP, S12 is performed; and in a case that the scene switching frame is not present in the current GOP, the current GOP is without the scene switching frame, and the process returns to S01 to receive the next GOP as the current GOP.

In S12, video frames are reversely traversed from the last frame. That is, the video frames in the current GOP are traversed in a reverse order.

In S13, whether the current frame is the scene switching frame is determined. In a case that the current frame is the scene switching frame, S14 is performed.

In S14, whether the current frame is the last frame of the current GOP is determined. In a case that the current frame is the last frame of the current GOP, S15 is performed; and in a case that the current frame is not the last frame of the current GOP, S16 is performed.

In S15, video frames are forward traversed from the second frame. That is, the video frames in the current GOP are forward traversed from the second frame, and the process returns to S17.

In S16, whether the previous video frame and a next video frame of the current frame constitute the scene switching is determined. In a case that the previous video frame and the next video frame of the current frame constitute the scene switching, S18 is performed; and in a case that the previous video frame and the next video frame of the current frame do not constitute the scene switching, S19 is performed.

In S17, whether the current video frame is marked as the scene switching frame is determined. In a case that the current video frame is marked as the scene switching frame, S18 is performed; and in a case that current video frame is not marked as the scene switching frame, S20 is performed.

In S18, the current frame is determined as the scene switching frame, S21 and S22 are performed.

In S19, whether the current frame is the second frame of the current GOP is determined. In a case that the current frame is the second frame of the current GOP, the current GOP is determined to be without the scene switching frame; and in case that the current frame is not the second frame of the current GOP, the next frame of the current frame is determined as the current frame, and the process returns to S13.

In S20, whether the current frame is the last frame of the current GOP is determined. In a case that the current frame is the last frame of the current GOP, the current GOP is determined to be without the scene switching frame; and in a case that the current frame is not the last frame of the current GOP, the next frame of the current frame is determined as the current frame, and the process returns to S17.

In S21, the scene switching markers of other video frames are cancelled.

In S22, whether the current GOP is close to an end of a sequence is determined. That is, whether the current GOP is close to an end of a video frame sequence of the video data is determined. Exemplarily, whether the number of the video frames in the current GOP is less than a specified number. In a case that the current GOP is close to the end of the sequence, S23 is performed; and in a case that the current GOP is not close to the end of the sequence, S24 is performed.

In S23, the current frame is not processed as the scene switching frame.

In S24, the current frame is determined as the scene switching frame to re-divide the current GOP.

According to some embodiments, the scene switching operation is performed on the received current GOP. In the case that the scene switching frame is present in the current GOP, whether the last video frame of the current GOP is the scene switching frame is determined. In the case that the last video frame of the current GOP is the scene switching frame, the first scene switching frame of the current GOP is determined as the target scene switching frame. In the case that the last video frame of the current GOP is not the scene switching frame, the scene switching frames in the current GOP are traversed from back to front. In the case that the next video frame of the current scene switching frame constitutes the scene switching relative to the previous video frame of the current scene switching frame, the current scene switching frame is determined as the target scene switching frame, and the previous video frame of the target scene switching frame is determined as the last video frame of the current GOP to re-divide the current GOP. In this way, the problem of the low compression rate of the video data caused by encoding all the scene switching frames in the current GOP as the key frames is addressed, and the number of video frames encoded as the key frames in the current GOP is reduced by selecting one target scene switching frame among the plurality of scene switching frames in each GOP to re-divide the current GOP, such that the compression rate of the video data is improved.

In determining the target scene switching frame, in a case that the number of video frames between the target scene switching frame and the last video frame of the video data is less than a predefined threshold, the scene switching frame is close to the end of the video, and scene switching frame is not determined as the scene switching frame. That is, the last GOP is not re-divided, the problem of the waste of video bit rates caused by adding the scene switching frame at the end of the video data and encoding the added scene switching frame as the key frame is addressed, such that the bit rate of the video data is improved.

Third Embodiment

Figure 4:
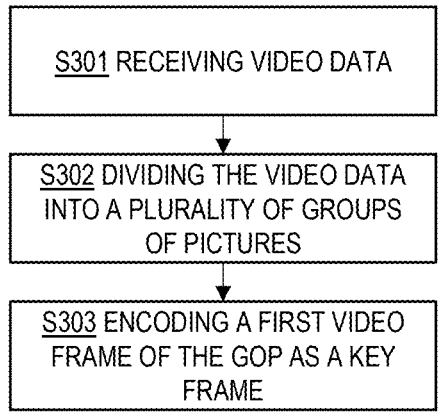
FIG. 4 is a flowchart of steps of a method for encoding a video according to a third embodiment of the present disclosure.

FIG. 4 is a flowchart of steps of a method for encoding a video according to a third embodiment of the present disclosure. This embodiment is applicable to a scenario where video data is encoded. The method is performed by an apparatus for dividing a group of pictures based on scene switching according to some embodiments of the present disclosure, which is implemented by hardware or software and integrated in an electronic device according to some embodiments of the present disclosure. As illustrated in FIG. 4, the method for encoding the video according to this embodiment includes the following steps.

In S301, video data is received.

In some embodiments of the present disclosure, the video data refers to captured original video data, that is, an uncoded video frame sequence without encoding. In some application scenarios, the video data is an original video frame sequence captured by a camera controlled by a video application such as a live broadcast application and a short video platform.

In S302, the video data is divided into a plurality of groups of pictures.

Each GOP is predefined to include a specified number of video frames, and each time an encoder receives the specified number of video frames, that is, a current GOP is received. Then a scene switching operation is performed on the current GOP to determine whether the current GOP is required to be re-divided. In a case that the current GOP is required to be re-divided, the number of video frames included in the divided current GOP is less than a predefined specified number. For the details, reference is made to the method for dividing the group of pictures based on scene switching according to the first embodiment or the second embodiment, which is not repeated herein.

In S303, a first video frame of the GOP is encoded as a key frame.

For each of the divided GOPs, the first video frame of the GOP is encoded as the key frame (an I frame), and other video frames of the GOP are encoded as prediction frames (a P frame or a B frame). The method for encoding the video is not limited herein.

According to the method for encoding the video according to the embodiments of the present disclosure, upon receipt of the video data, the video data is divided into GOPs based on the method for dividing the group of pictures based on scene switching, and the first video frame of each of the GOPs is encoded as the key frame. Because the current GOP with the scene switching is re-divided based on the method for dividing the group of pictures based on scene switching, the problem of the low compression rate of the video data caused by encoding all the scene switching frames in the current GOP as the key frames is addressed. The number of video frames encoded as the key frames in the current GOP is reduced by selecting one target scene switching frame among the plurality of scene switching frames in each of the GOPs to re-divide the current GOP, and thus the compression rate of the video data is improved.

Fourth Embodiment

Figure 5:
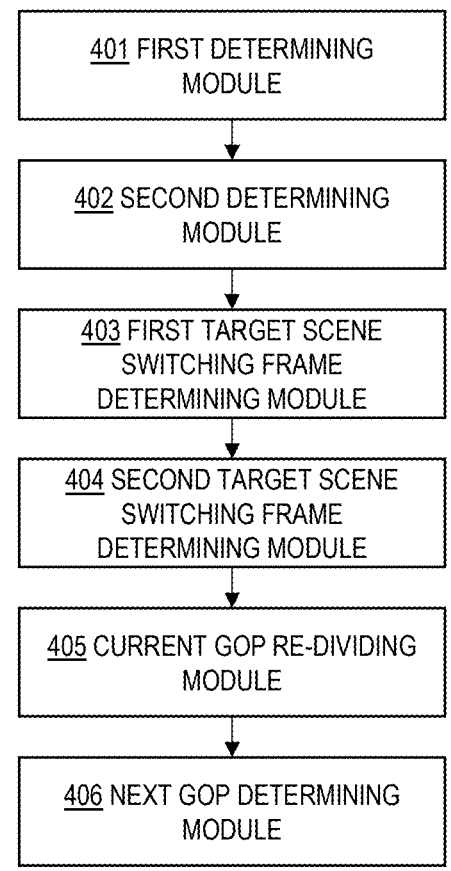
FIG. 5 is a structural diagram of an apparatus for dividing a group of pictures based on scene switching according to a fourth embodiment of the present disclosure.

FIG. 5 is a structural diagram of an apparatus for dividing a group of pictures based on scene switching according to a fourth embodiment of the present disclosure.

As illustrated in FIG. 5, the apparatus for dividing the group of pictures based on scene switching according to this embodiment includes: a first determining module 401, configured to determine whether a scene switching frame is present in a current GOP of received video data, wherein the current GOP includes a specified number of video frames; a second determining module 402, configured to, in a case that at least one scene switching frame is present in the current GOP, determine whether a last video frame of the current GOP is the scene switching frame; a first target scene switching frame determining module 403, configured to, in response to the last video frame of the current GOP being the scene switching frame, determine a first scene switching frame of the current GOP as a target scene switching frame of the current GOP; a second target scene switching frame determining module 404, configured to, in response to the last video frame of the current GOP being not the scene switching frame, acquire the target scene switching frame by traversing the at least one scene switching frame in the current GOP from back to front; a current GOP re-dividing module 405, configured to determine a previous video frame of the target scene switching frame as the last video frame of the current GOP; and a next GOP determining module 406, configured to determine the specified number of video frames that follow the target scene switching frame and include the target scene switching frame as a next GOP, determine the next GOP as the current GOP, and return to the first determining module.

The apparatus for dividing the group of pictures based on scene switching according to this embodiment is capable of performing the method for dividing the group of pictures based on scene switching according to the first embodiment or the second embodiment of the present disclosure, and includes function modules and achieves effects corresponding to performing the method.

Fifth Embodiment

Figure 6:
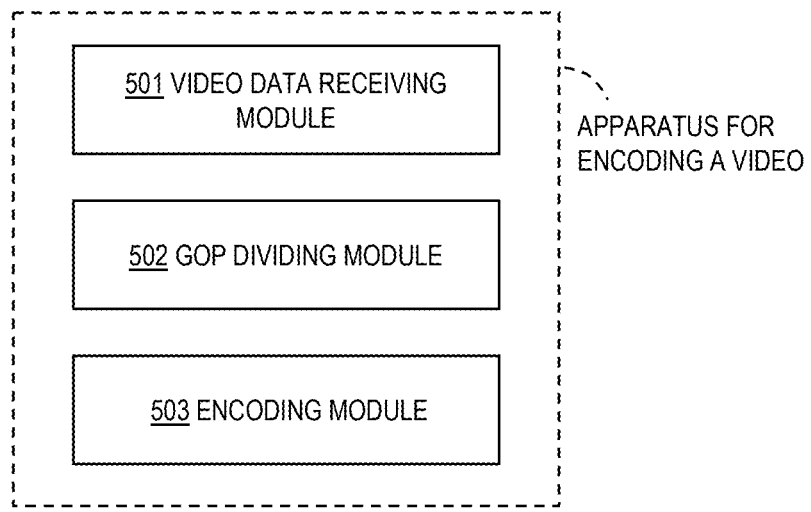
FIG. 6 is a structural diagram of an apparatus for encoding a video according to a fifth embodiment of the present disclosure.

FIG. 6 is a structural diagram of an apparatus for encoding a video according to a fifth embodiment of the present disclosure.

As illustrated in FIG. 6, the apparatus for encoding the video according to this embodiment includes: a video data receiving module 501, configured to receive video data; a GOP dividing module 502, configured to divide the video data into a plurality of GOPs; and an encoding module 503, configured to encode a first video frame of each of the GOPs as a key frame; wherein the plurality of GOPs are divided based on the method for dividing the group of pictures based on scene switching according to the first embodiment or the second embodiment of the present disclosure.

The apparatus for encoding the video according to this embodiment is capable of performing the method for encoding the video according to the third embodiment of the present disclosure, and includes function modules and achieves effects corresponding to performing the method.

Sixth Embodiment

Figure 7:
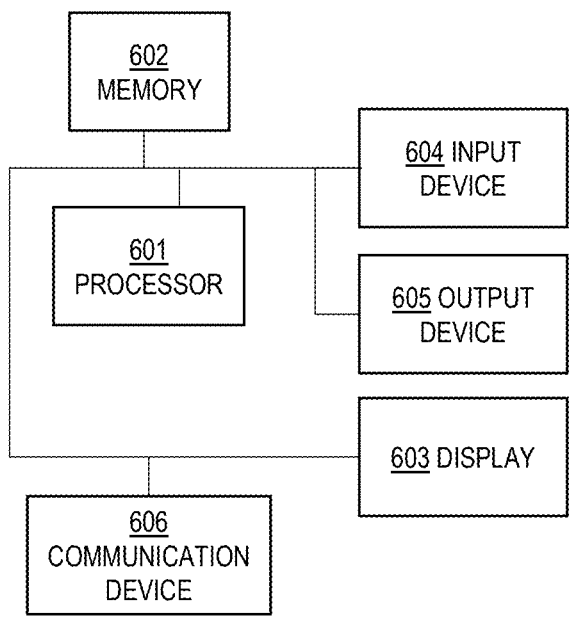
FIG. 7 is a structural diagram of an electronic device according to a sixth embodiment of the present disclosure.

FIG. 7 is a structural diagram of an electronic device according to a sixth embodiment of the present disclosure. As illustrated in FIG. 7, the electronic device includes: a processor 601, a memory 602, a display 603 with a touch function, an input device 604, an output device 605, and a communication device 606. The number of processors 601 in the electronic device is one or more, and one processor 601 is used as an example in FIG. 7. The processor 601, the memory 602, the display 603, the input device 604, the output device 605, and the communication device 606 of the electronic device are connected by a bus or other ways, and the connection by the bus is used as an example in FIG. 7. The electronic device is configured to perform the method for dividing the group of pictures based on scene switching, and/or, the method for encoding the video according to any of the embodiments of the present disclosure.

Some embodiments of the present disclosure further provide a computer-readable storage medium storing one or more computer programs, wherein the one or more computer programs, when loaded and run by a processor of an electronic device, cause the electronic device to perform the method for dividing the group of pictures based on scene switching, and/or, the method for encoding the video according to the above method embodiments.

The descriptions of the apparatus, electronic device, and storage medium embodiments are relatively simple because they are substantially similar to the method embodiments. For the relevant portions, reference may be made to descriptions of the method embodiments.

In the description herein, terms "an embodiment," "some embodiments," "example," or "some examples," and the like indicate that the features, structures, materials, or characteristics described in connection with the embodiment or example are included in at least one embodiment or example of the present disclosure. In this disclosure, the schematic description of the above terms does not necessarily refer to the same embodiment or example. Furthermore, the features, structures, materials, or characteristics described may be combined in any one or more embodiments or examples in a suitable manner.

What is claimed is:

1. A method for dividing a group of pictures based on scene switching in encoding a video, comprising:
   determining whether a scene switching frame is present in a current group of pictures of received video data, wherein the current group of pictures comprises a specified number of video frames;
   in response to at least two scene switching frames being present in the current group of pictures, determining whether a last video frame of the current group of pictures is the scene switching frame;
   in response to the last video frame of the current group of pictures being one of the at least two scene switching frames, determining a first scene switching frame of the current group of pictures as a target scene switching frame of the current group of pictures;
   in response to the last video frame of the current group of pictures being not one of the at least two scene switching frames, acquiring the target scene switching frame by traversing the at least two scene switching frames in the current group of pictures from back to front;
determining a previous video frame of the target scene switching frame as the last video frame of the current group of pictures; and
determining the specified number of video frames that follow the target scene switching frame as a next group of pictures, wherein the next group of pictures comprises the target scene switching frame, encoding the target scene switching frames as a key frame of the next group of pictures determining the next group of pictures as the current group of pictures, and returning to the step of determining whether a scene switching frame is present in a current group of pictures of received video data, each group of pictures comprises only one key frame.

2. The method according to claim 1, further comprising:
upon determining the target scene switching frame, determining video frames in the current group of pictures except for the target scene switching frame as non-scene switching frames.

3. The method according to claim 1, wherein prior to determining whether the scene switching frame is present in the current group of pictures of the received video data, the method further comprises:
performing a scene switching detection operation on the current group of pictures of the received video data; and
in a case that the scene switching frame is detected to be present in the current group of pictures, generating a scene switching marker for the current group of pictures.

4. The method according to claim 3, wherein performing the scene switching detection operation on the current group of pictures of the received video data comprises:
traversing video frames following a first video frame in the current group of pictures;
during traversing the video frames, determining whether a current video frame is the scene switching frame relative to the first video frame in the current group of pictures; and
in response to the current video frame being the scene switching frame relative to the first video frame in the current group of pictures, in a case that the current video frame is the scene switching frame relative to a previous video frame of the current video frame, marking the current video frame as the scene switching frame; or
in response to the current video frame being not the scene switching frame relative to the first video frame in the current group of pictures, determining video frames between the current video frame and the first video frame as non-scene switching frames.

5. The method according to claim 4, wherein performing the scene switching detection operation on the current group of pictures of the received video data further comprises:
in a case the current video frame is marked as the scene switching frame:
calculating a first intra-frame prediction cost of the current video frame and an $(n-1)^{th}$ video frame, wherein n is a position at which the current video frame is in the current group of pictures;
calculating a second intra-frame prediction cost of the $(n-1)^{th}$ video frame and an $(n-2)^{th}$ video frame;
calculating a difference between the first intra-frame prediction cost and the second intra-frame prediction cost; and in a case that a ratio of the difference to the second intra-frame prediction cost is greater than a predefined threshold, keeping the current video frame being marked as the scene switching frame; or
in a case that the ratio of the difference to the second intra-frame prediction cost is less than the predefined threshold, determining the current video frame as the non-scene switching frame, wherein the intra-frame prediction cost is a residual acquired by subtracting an original value from a prediction value, after the prediction value Is generated using encoded pixels in adjacent pictures.

6. The method according to claim 1, wherein determining whether the scene switching frame is present in the current group of pictures of the received video data comprises:
determining whether a scene switching marker is present in the current group of pictures of the received video data;
in response to the scene switching marker being present in the current group of pictures of the received video data, determining that at least two scene switching frames are present in the current group of pictures; or
in response to the scene switching marker being not present in the current group of pictures of the received video data, determining that the scene switching frame is not present in the current group of pictures.

7. The method according to claim 1, wherein upon determining whether the scene switching frame is present in the current group of pictures of the received video data, the method further comprises:
in a case that the scene switching frame is not present in the current group of pictures, determining a next group of pictures as the current group of pictures, and returning to the step of determining whether a scene switching frame is present in a current group of pictures of received video data.

8. The method according to claim 1, wherein acquiring the target scene switching frame by traversing the scene switching frames in the current group of pictures from back to front comprises:
traversing the scene switching frames in the current group of pictures from back to front;
with respect to a current scene switching frame, determining whether a next video frame of the current scene switching frame, relative to a previous video frame of the current scene switching frame, constitutes scene switching;
in response to the next video frame of the current scene switching frame, relative to the previous video frame of the current scene switching frame, constituting the scene switching, determining the current scene switching frame as the target scene switching frame; and
determining video frames in the current group of pictures except for the current scene switching frame as non-scene switching frames.

9. The method according to claim 8, wherein determining the current scene switching frame as the target scene switching frame comprises:
calculating a number of video frames between the current scene switching frame and a last video frame of the video data; and
in a case that the number of video frames is less than a predefined number, determining the current scene switching frame as the non-scene switching frame.

10. The method according to claim 1, wherein prior to determining the first scene switching frame of the current group of pictures as the target scene switching frame of the current group of pictures, the method further comprises:
calculating a number of video frames between the first scene switching frame and a last video frame of the video data; and
in a case that the number of video frames is less than a predefined number, determining the first scene switching frame as non-scene switching frame.

11. The method according to claim 1, wherein prior to determining whether the last video frame of the current group of pictures is the scene switching frame, the method further comprises:
in a case that the at least two scene switching frames are present in the current group of pictures, determining whether a previous group of pictures is re-divided, wherein the previous group of pictures is a received group of pictures prior to receiving the current group of pictures;
in response to the previous group of pictures being re-divided, not re-dividing the current group of pictures, and receiving a next group of pictures of the current group of pictures as the current group of pictures, and returning to the step of determining whether a scene switching frame is present in a current group of pictures of received video data; or
in response to the previous group of pictures being not re-divided, in a case that the scene switching frame is present in the previous group of pictures, not re-dividing the current group of pictures, and receiving the next group of pictures of the current group of pictures as the current group of pictures, and returning to the step of determining whether a scene switching frame is present in a current group of pictures of received video data; and
in a case that the scene switching frame is not present in the previous group of pictures, returning to the step of determining whether a last video frame of the current group of pictures is the scene switching frame.

12. A method for encoding a video, comprising:
receiving video data;
dividing the video data into a plurality of groups of pictures; and
encoding a first video frame in each of the group of pictures as a key frame;
wherein the plurality of groups of pictures are divided according to the method for dividing the group of pictures based on scene switching as defined in claim 1.

13. An electronic device for encoding a video, comprising:
at least one processor; and
a memory, configured to store at least one program;
wherein the at least one program, when loaded and run by the at least one processor, causes the at least one processor to perform a method for encoding a video as defined in claim 12.

14. A non-transitory computer-readable storage medium, storing one or more computer programs, wherein the one or more computer programs, when loaded and run by a processor, cause the processor to perform the method for encoding a video as defined in claim 12.

15. An electronic device for dividing a group of pictures based on scene switching in encoding a video, comprising:
at least one processor; and
a memory, configured to store at least one program;
wherein the at least one program, when loaded and run by the at least one processor, causes the at least one processor to perform:
determining whether a scene switching frame is present in a current group of pictures of received video data, wherein the current group of pictures comprises a specified number of video frames;
in response to at least two scene switching frames being present in the current group of pictures, determining whether a last video frame of the current group of pictures is the scene switching frame;
in response to the last video frame of the current group of pictures being one of the at least two scene switching frames, determining a first scene switching frame of the current group of pictures as a target scene switching frame of the current group of pictures;
in response to the last video frame of the current group of pictures being not one of the at least two scene switching frames, acquiring the target scene switching frame by traversing the at least one scene switching frame in the current group of pictures from back to front;
determining a previous video frame of the target scene switching frame as the last video frame of the current group of pictures; and
determining the specified number of video frames that follow the target scene switching frame as a next group of pictures, wherein the next group of pictures comprises the target scene switching frame, encoding the target scene switching frame as a key frame of the next group of pictures, determining the next group of pictures as the current group of pictures, and returning to the step of determining whether a scene switching frame is present in a current group of pictures of received video data, each group of pictures comprises only one key frame.

16. The electronic device for dividing the group of pictures based on scene switching in encoding a video according to claim 15, wherein the at least one program, when loaded and run by the at least one processor, causes the at least one processor to perform:
upon determining the target scene switching frame, determining video frames in the current group of pictures except for the target scene switching frame as non-scene switching frames.

17. The electronic device for dividing the group of pictures based on scene switching in encoding a video according to claim 15, wherein the at least one program, when loaded and run by the at least one processor, causes the at least one processor to perform:
performing a scene switching detection operation on the current group of pictures of the received video data; and
in a case that the scene switching frame is detected to be present in the current group of pictures, generating a scene switching marker for the current group of pictures.

18. The electronic device for dividing the group of pictures based on scene switching in encoding a video according to claim 17, wherein the at least one program, when loaded and run by the at least one processor, causes the at least one processor to perform:
traversing video frames following a first video frame in the current group of pictures;
during traversing the video frames, determining whether a current video frame is the scene switching frame relative to the first video frame in the current group of pictures; and
in response to the current video frame being the scene switching frame relative to the first video frame in the current group of pictures, in a case that the current video frame is the scene switching frame relative to a previous video frame of the current video frame, marking the current video frame as the scene switching frame; or in response to the current video frame being not the scene switching frame relative to the first video frame in the current group of pictures, determining video frames between the current video frame and the first video frame as non-scene switching frames.

19. The electronic device for dividing the group of pictures based on scene switching in encoding a video according to claim 18, wherein the at least one program, when loaded and run by the at least one processor, causes the at least one processor to perform:

in a case the current video frame is marked as the scene switching frame:

calculating a first intra-frame prediction cost of the current video frame and an $(n-1)^{th}$ video frame, wherein n is a position at which the current video frame is in the current group of pictures;

calculating a second intra-frame prediction cost of the $(n-1)^{th}$ video frame and an $(n-2)^{th}$ video frame;

calculating a difference between the first intra-frame prediction cost and the second intra-frame prediction cost; and in a case that a ratio of the difference to the second intra-frame prediction cost is greater than a predefined threshold, keeping the current video frame being marked as the scene switching frame; or in a case that the ratio of the difference to the second intra-frame prediction cost is less than the predefined threshold, determining the current video frame as the non-scene switching frame, wherein the intra-frame prediction cost is a residual acquired by subtracting an original value from a prediction value, after the prediction value is generated using encoded pixels in adjacent pictures.

20. A non-transitory computer-readable storage medium, storing one or more computer programs, wherein the one or more computer programs, when loaded and run by a processor, cause the processor to perform:

determining whether a scene switching frame is present in a current group of pictures of received video data, wherein the current group of pictures comprises a specified number of video frames;

in response to at least two scene switching frames being present in the current group of pictures, determining whether a last video frame of the current group of pictures is the scene switching frame;

in response to the last video frame of the current group of pictures being one of the at least two scene switching frames, determining a first scene switching frame of the current group of pictures as a target scene switching frame of the current group of pictures;

in response to the last video frame of the current group of pictures being not one of the at least two scene switching frames, acquiring the target scene switching frame by traversing the at least one scene switching frame in the current group of pictures from back to front;

determining a previous video frame of the target scene switching frame as the last video frame of the current group of pictures; and determining the specified number of video frames that follow the target scene switching frame as a next group of pictures, wherein the next group of pictures comprises the target scene switching frame, encoding the target scene switching frame as a key frame of the next group of pictures, determining the next group of pictures as the current group of pictures, and returning to the step of determining whether a scene switching frame is present in a current group of pictures of received video data, each group of pictures comprises only one key frame.

* * * * *